(12) United States Patent
Burg

(10) Patent No.: US 6,487,981 B1
(45) Date of Patent: Dec. 3, 2002

(54) AIR ASSISTED LANDING CRAFT

(76) Inventor: Donald E. Burg, 15840 SW. 84 Ave., Miami, FL (US) 33157

( * ) Notice: Subject to any disclaimer, the term of this patent is extended or adjusted under 35 U.S.C. 154(b) by 0 days.

(21) Appl. No.: 09/893,755

(22) Filed: Jun. 27, 2001

(51) Int. Cl.$^7$ ................................................ B63B 1/34
(52) U.S. Cl. ..................................... 114/67 A; 180/126
(58) Field of Search .................. 114/67 A; 180/116–129

(56) References Cited

U.S. PATENT DOCUMENTS

| | | | | |
|---|---|---|---|---|
| 3,589,058 A | * | 6/1971 | Labat | |
| 4,068,606 A | * | 1/1978 | Veldhuizen | ................ 114/67 A |
| 5,746,146 A | * | 5/1998 | Bixel, Jr. | ................... 114/67 A |

* cited by examiner

*Primary Examiner*—Ed Swinehart
(74) *Attorney, Agent, or Firm*—Robert J. Van Der Wall

(57) ABSTRACT

Presented is an advanced non-amphibious landing craft that is partially supported by one or more artificially pressurized air cushions. In the preferred embodiment, the air cushions are bordered on each side by sidehulls, at the bow by a flexible seal, and at the stern by a fixed angled to horizontal air cushion aft seal member. The forward flexible seal element is attached to the underside of a bow ramp so that, during beaching and unloading of cargo such as vehicles, the forward flexible seal element simply folds underneath the moveable bow ramp as the ramp is lowered. Other features of the instant invention include built in fore and aft angled ramps and a moveable stern ramp. The aft angled ramp nests downward into the fixed air cushion aft seal.

29 Claims, 3 Drawing Sheets

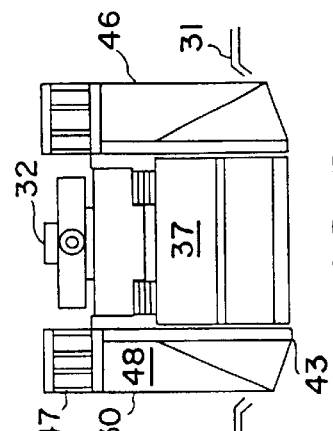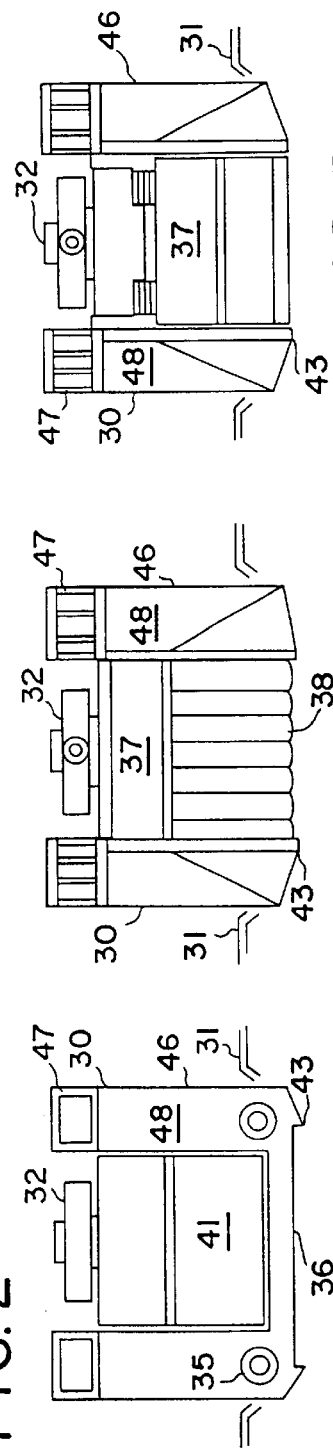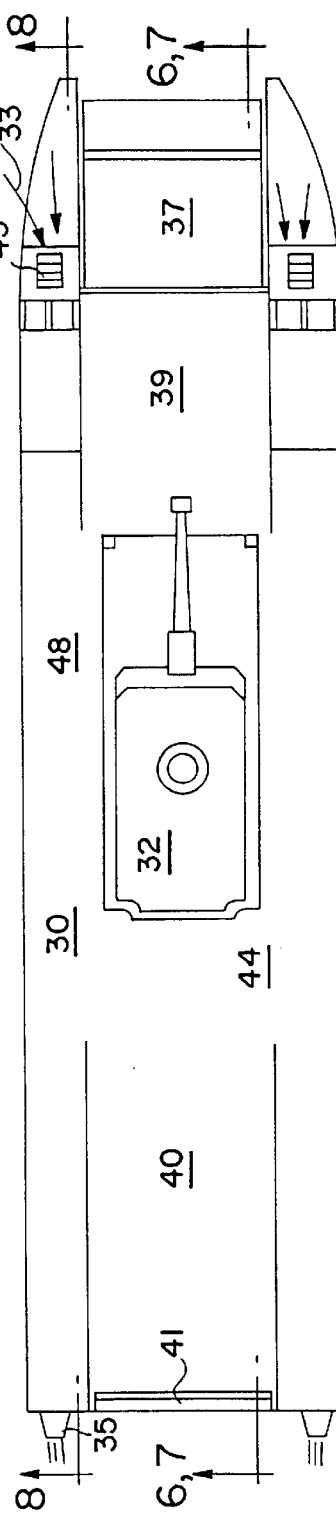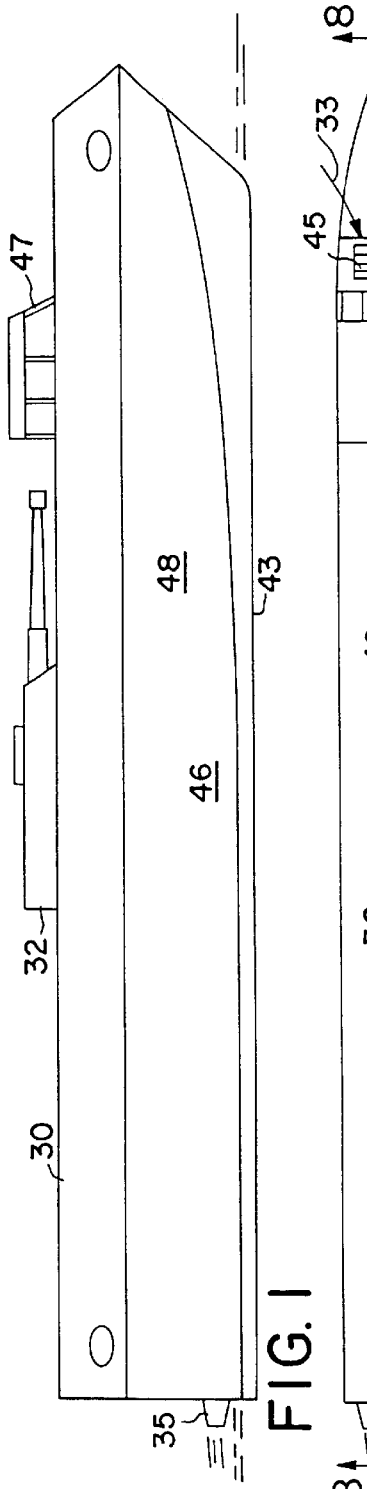

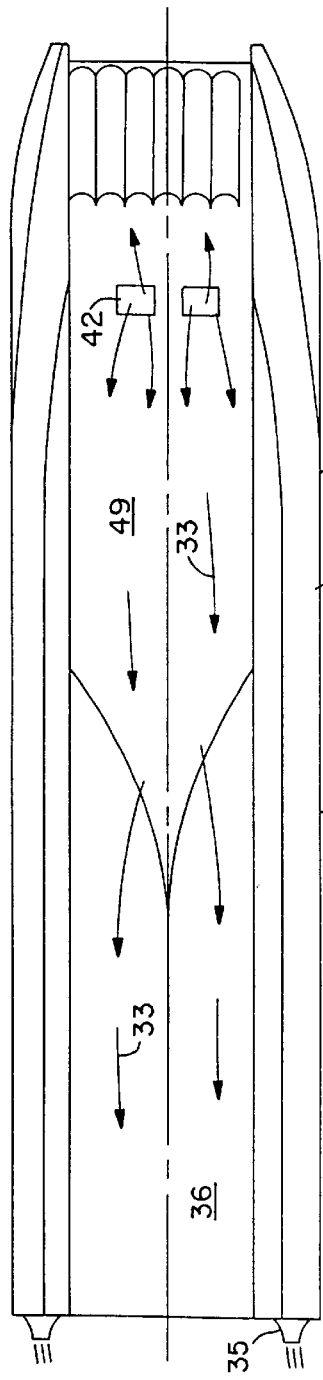
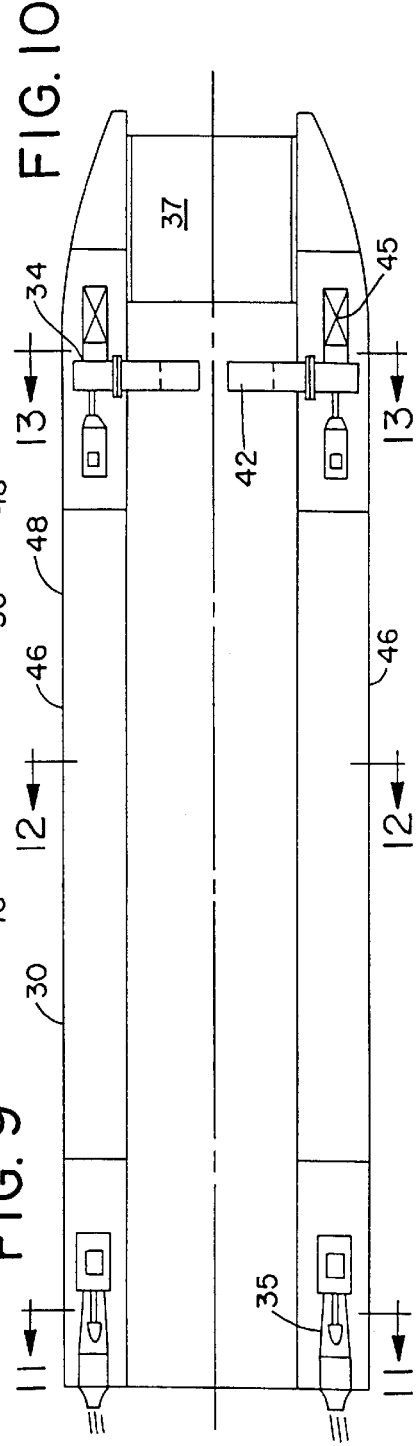
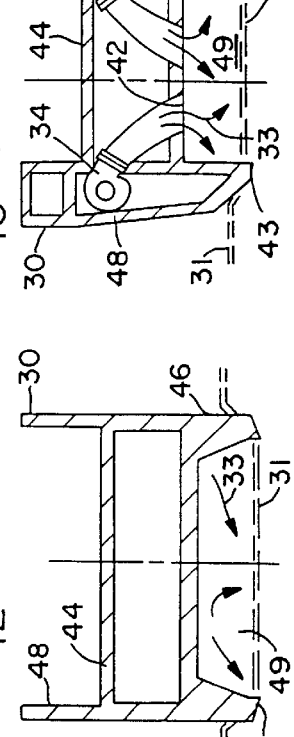
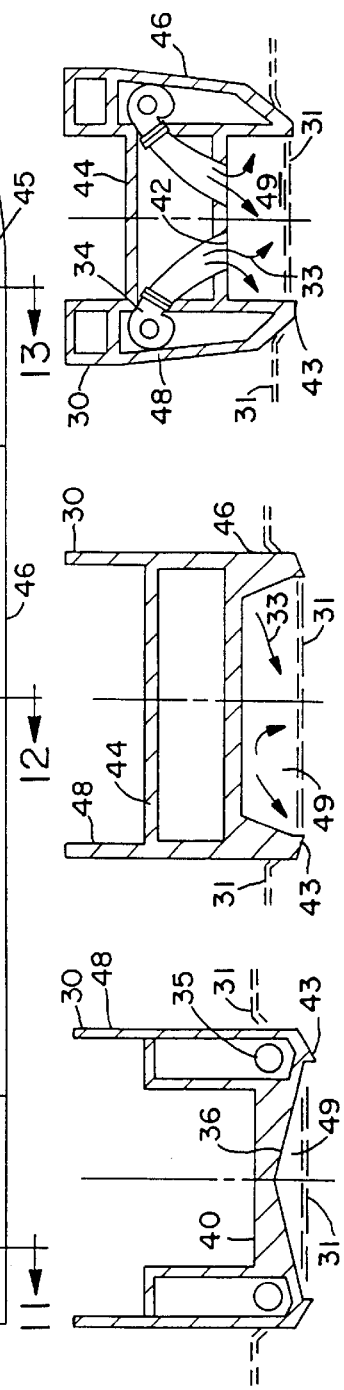
FIG. 9  FIG. 10  FIG. 11  FIG. 12  FIG. 13

AIR ASSISTED LANDING CRAFT

FIELD OF THE INVENTION

This invention relates to the field of marine vehicles that are at least partially supported by one or more artificially pressurized air cushions. The air cushion(s) provides a supporting layer of air between the vehicle's hull and a water surface thereby reducing wetted area friction and hence improving efficiency. There are further benefits when this technology is applied to landing craft since, by regulating the pressurized air supply to the air cushion(s), the draft of the landing craft can be controlled when at a beachhead or when loading vehicles and/or cargo from a supply ship. There are unique advantages to the instant invention related to the method of utilizing loading and unloading ramps that differ from prior art landing craft concepts.

BACKGROUND OF THE INVENTION

The need for shallow draft high-speed landing craft for military applications is becoming more apparent. The U.S. Navy has developed an amphibious hovercraft called the LCAC (Landing Craft Air Cushion). The LCAC has flexible skirts around its full periphery and is therefore a generic hovercraft in concept. The full 360-degree flexible seals are necessary for an amphibious air cushioned vehicle. The LCAC is capable of speeds of over 40 knots in moderate seas and can transport a 75-ton tank up onto a beach. Propulsion is provided by two 4,000 HP gas turbines driving air propellers. A third 4,000 HP gas turbine provides power to drive the blowers that supply pressurized air to the supporting air cushion(s). To date, approximately ninety LCACs have been built. Cost of each LCAC is over 20 million dollars.

There is also a need for a new class of lower cost non-amphibious high-speed shallow draft landing craft. Because this new class of landing craft is non-amphibious, it does not require the expensive and high maintenance flexible air sealing skirts that extend around the full 360-degree periphery of a hovercraft such as the LCAC. Further, the hovercraft requires air propellers that are noisy and somewhat inefficient at speeds in the 30–60 knot area. The non-amphibious landing craft as proposed herein can utilize more efficient and less noisy water propulsors such as waterjets since its hulls are always in water contact.

The instant invention, called the Air Assisted Landing Craft (AALC) herein, utilizes a blower pressurized air cushioned hull but with fixed hard structure sidehulls. In its preferred embodiment it has a flexible bow seal and a fixed structure stern seal. Some of the unique features of the instant invention include a bow ramp that incorporates means on its underside for attaching a flexible bow seal. When the bow ramp is lowered the flexible bow seal elements simply fold up against the ground. After vehicles and other cargo is discharged onto the beach the bow ramp is retracted to its upper position which places the flexible seals back into position. As the blower(s) is actuated, the air cushion fills with pressurized gas to thereby reduce water draft so that the AALC can back off of the beach.

The instant invention AALC can also incorporate a stern ramp for stern loading and unloading. Since the air cushion stern seal is a fixed part of the AALC structure, it is a further feature of the instant invention to incorporate the AALC's stern ramp into its air cushion stern seal design This simple stern ramp concept is not possible with standard hovercraft landing craft since they have flexible seals at their stern.

The instant invention offers advancements over Applicant's earlier inventions as well as over the prior art. These advancements are discussed in some detail in the following sections.

SUMMARY OF THE INVENTION

The primary object of the instant invention is to provide a superior landing craft for transporting vehicles and other cargo to beachheads and unloading them safely and easily on said beachheads.

A related object of the invention is that it be capable of operating at high speed where high speed is defined herein as being speeds of over 15 knots.

A further object of the invention is that it be at least partially supported by a pressurized gas cushion.

It is an object of the invention that it can utilize sidehulls to insure transverse or roll stability as well as help seal in the pressurized air cushion(s).

Yet a further object of the invention is that an air or gas cushion stem seal can be a simple part of the hull structure.

It is a directly related object of the invention that the stern seal, in a sum of its parts and as seen in a transverse vertical plane of the hull, be angled over at least a majority of its width.

It is yet another directly related object of the invention that the stem seal be of a generally inverted-V shape.

It is a further related object of the invention that a portion of the stem loading ramp can be recessed into the area of the gas cushion stem seal.

It is a feature of the instant invention that a moveable, in relation to the hull, gas cushion bow seal can be utilized.

It is a directly related object of the invention that the moveable bow seal can be fabricated, at least in part, of a flexible material.

It is a further related object of the invention that the flexible bow seal extend between the sidehulls.

It is a major feature of the invention that the moveable bow seal be, at least in part, attached to a moveable bow ramp so that the moveable bow seal is displaced out of the way when the moveable bow ramp is lowered.

The invention will be better understood upon reference to the drawings and the detailed description of the invention which follow in which:

BRIEF DESCRIPTION OF THE DRAWINGS

FIG. 1 presents a profile view of a landing craft to the instant invention criteria.

FIG. 2 is a topside plan view of the landing craft of FIG. 1. Note that the cargo in this instance is a tank.

FIG. 3 is a stem view of the landing craft of FIGS. 1 and 2.

FIG. 4 presents a bow view with the bow loading ramp up and locked in position. Note the flexible seal elements at the forward lower portion. These flexible seal elements helps pressurized gas in the supporting air cushion(s).

FIG. 5 gives a similar bow view as that presented in FIG. 4 but with the bow ramp lowered to allow the cargo, a tank in this instance, to be discharged. Note that the flexible seals are retracted under the bow ramp here.

FIG. 9 presents a bottom plan view of the instant invention AALC. This view shows the blower air or gas discharges, moveable bow seal, and a fixed stern seal.

FIG. 10 is a topside plan view of the AALC that shows preferred machinery arrangements.

FIG. 11 is a cross section, as taken through line 11—11 of FIG. 10, that shows waterjet propulsors as they are located in the sidehulls here. It also shows the preferred inverted-V shape for the sidehulls.

FIG. 12 presents a cross section, as taken through line 12—12 of FIG. 10, that shows a typical midship section of the instant invention AALC.

FIG. 13 is another cross section, as taken through line 13—13 of FIG. 10, that shows a cross section in way of the air cushion blowers forward.

DETAILED DESCRIPTION

Figure 6:
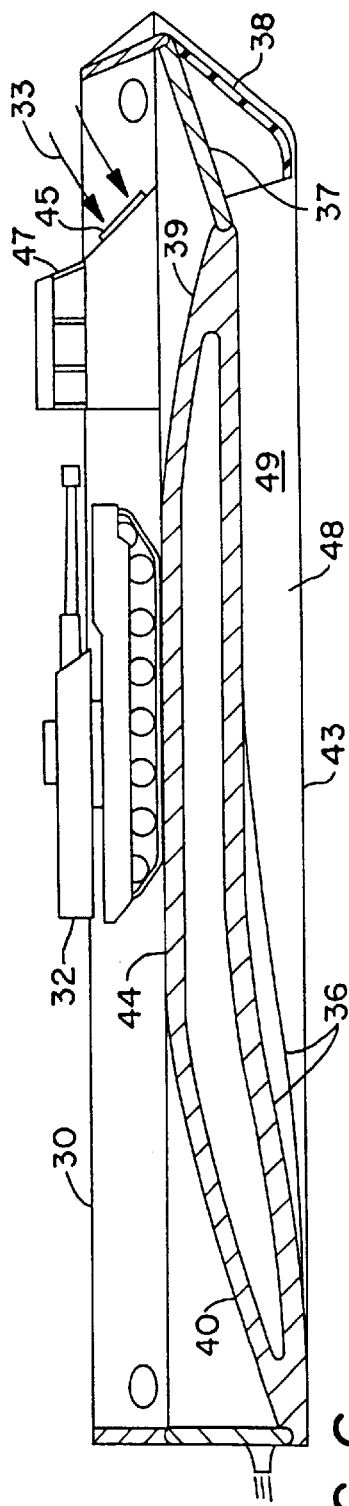
FIG. 6 is a cross section, as taken through line 6—6 of FIG. 2, that shows the instant invention advanced landing craft as it is configured for high speed running over a sea surface. Note the bow ramp is up and the moveable bow seal in its high-speed operational condition.

FIG. 1 presents a profile view of the instant invention AALC 30 that shows a hull 48, sidehull 46, keel 43, pilothouse 47, tank cargo 32, and propulsor 35.

FIG. 2 is a topside view of the AALC 30 showing deployable bow ramp 37 that is moveable in relation to the hull 48. A fixed structure bow ramp 39 and a fixed structure stem ramp 40 are used in the preferred arrangement of the instant invention since they cut down on length and complications of a bow moveable ramp 37 and stern moveable ramp 41. Shown also in FIG. 2 are the main deck 44, blower inlet 45, and airflow arrows 33 that show air going into the blower inlets 45.

FIG. 3 presents a stem view of the instant invention AALC 30. IN this instance the stem ramp 41 is up, as it is in FIG. 2, so that the AALC is secure for high-speed transit.

FIG. 4 is a bow view of the AALC 30 with its bow ramp 37 up, as it is in FIG. 2, to allow high-speed transit. Note that the moveable, in relation to the hull 48, bow seals 38 are made of flexible material in this preferred embodiment of the instant invention.

FIG. 5 gives the same bow view as FIG. 4 but with the bow ramp 37 down to allow discharge of the cargo 32, in this instance a tank, onto a beachhead. The moveable bow seal elements are collapsed under the bow ramp 37 here.

FIG. 6 is a cross section, as taken through line 6—6 of FIG. 2, that shows an air or gas cushion recess 49, moveable in relation to the hull bow seal 38, and fixed air cushion stern seal 36. When the gas cushion recess 49 is pressurized with gas, the level of water inside the recess is proximal the keels 43.

Figure 7:
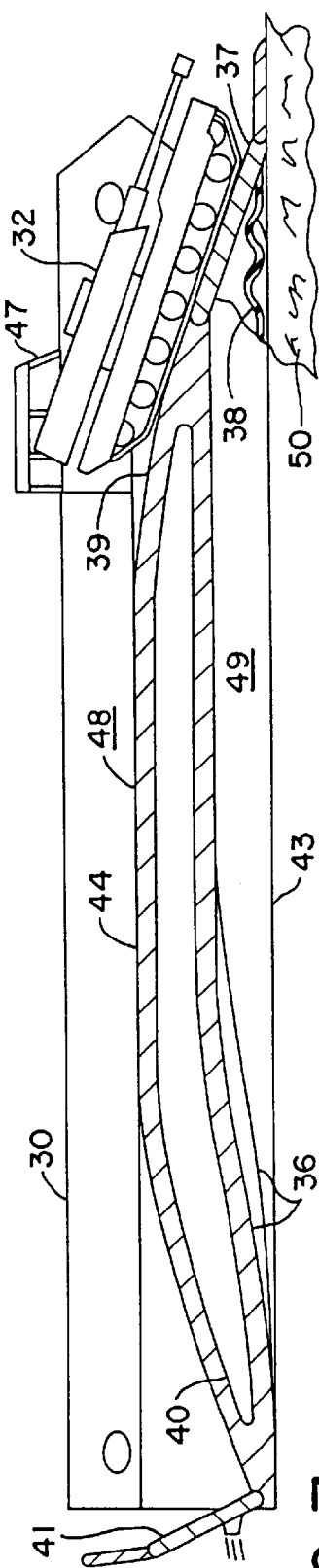
FIG. 7 presents a similar cross section as presented in FIG. 6 but in this case with the bow ramp down so that the transported tank can go ashore at a beachhead. Note that the moveable bow seal is simply folded under the moveable bow ramp in this case. This ability to have the moveable bow seal simply fold up out of the way solves many difficulties that would otherwise be encountered during beaching. A further item to note in FIGS. 6 and 7 is the tapering down of the deck into fixed ramps fore and aft.

FIG. 7 is a similar cross section to that presented in FIG. 5 but, importantly, with the bow ramp down so that the tank cargo 32 can discharge onto a beachhead. Note how the moveable bow seal element is simply folded between the underside of the bow ramp and the ground 50 here. Other items of note are the fixed portion bow ramp 39 and the fixed portion stem ramp 40. The advantage to angling these fixed bow and stem ramp portions downward as part of the hull structure is that less moveable bow and stem ramp is required.

Figure 8:
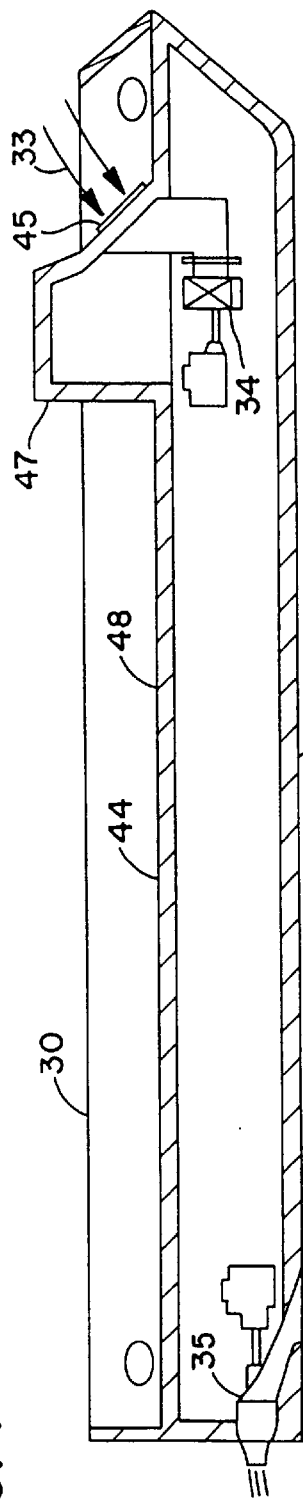
FIG. 8 is a cross section, as taken through line 8—8 of FIG. 2, that shows machinery arrangements including one of the air cushion pressurizing blowers and its drive engine.

FIG. 8 presents a cross section, as taken through line 8—8 of FIG. 2, that shows typical machinery arrangements. Shown are a propulsor 35, blower 34, blower inlet 45, and blower inlet airflow arrows 33.

FIG. 9 is a bottom plan view of the instant invention AALC 30. Shown are the blower discharge openings 42 in the gas cushion recess 49, and the shape of the stem seal 36 in its preferred inverted-V shape.

FIG. 10 is a topside plan view, as taken with the deck removed that shows typical machinery arrangements of the instant invention AALC 30. The blowers 34 are discharging sideways into their discharge openings 42 in this case.

FIG. 11 is a cross section, as taken through line 11—11 of FIG. 10, that shows the preferred inverted-V shape of the stem seal 36. The waterline 31 as it would occur in this cross section is also shown. There is pressurized air or gas above the waterline 31.

FIG. 12 presents a typical midship cross section, as taken through line 12—12 of FIG. 10, that shows the gas cushion recess 49 and the waterline 31 at its lower extremity.

FIG. 13 is a cross section, as taken through line 13—13 of FIG. 10, that shows the blowers 34 as they are oriented in the preferred embodiment of the instant invention. The blower discharge openings 42 are located to provide good gas circulation into the gas cushion 49.

While the invention has been described in connection with a preferred and several alternative embodiments, it will be understood that there is no intention to thereby limit the invention. On the contrary, there is intended to be covered all alternatives, modifications, and equivalents as may be included within the spirit and scope of the invention as defined by the appended claims, which are the sole definition of the invention.

What I claim is:

1. In an advanced marine landing craft having an artificially pressurized gas cushion disposed between an underside of a hull of said advanced marine landing craft and a water surface wherein said gas cushion, when it is pressurized with gas, supports a portion of a weight of the advanced marine landing craft, the improvement comprising:
   a moveable, in relation to the hull, gas cushion bow seal wherein said moveable gas cushion bow seal is in mechanical communication with a moveable, in relation to the hull, bow ramp and whereby said moveable gas cushion bow seal is disposed, at least in its majority, on an underside of said moveable bow ramp and is positioned between the moveable bow ramp and a ground surface when the moveable bow ramp is lowered during beaching of said advanced marine landing craft.

2. The advanced marine landing craft of claim 1 wherein said moveable bow seal is, at least in its majority, made of a flexible material.

3. The advanced marine landing craft of claim 1 wherein said moveable bow seal is composed of multiple elements.

4. The advanced marine landing craft of claim 1 which further comprises a fixed, in relation to the hull, aft to forward downward angling structural bow ramp built into an upper portion of a deck of the hull wherein said fixed structural bow ramp is, at least in its majority, aft of the moveable bow ramp.

5. The advanced marine landing craft of claim 1 which further comprises a moveable, in relation to the hull, stern ramp.

6. The advanced marine landing craft of claim 5 which further comprises a fixed, in relation to the hull, downward angling from forward to aft structural stern ramp built into an upper portion of a deck of the hull wherein said fixed structural bow ramp is, at least in its majority, forward of the moveable stern ramp.

7. The advanced marine landing craft of claim 1 which further comprises a gas cushion aft seal member that is, at least in part, a structural part of the hull.

8. The advanced marine landing craft of claim 7 which further comprises a downward angling from forward to aft structural stern ramp built into an upper portion of a deck of the hull, said downward angling stern ramp extends downward into a portion of the gas cushion aft seal member.

9. The advanced marine landing craft of claim 7 wherein a lower surface of said gas cushion aft seal member, as a sum of its parts and as seen in a vertical transverse plane of the hull, is angled to horizontal over a majority of its width.

10. The advanced marine landing craft of claim 7 wherein a lower surface of said gas cushion aft seal member, as a sum of its parts and as seen in a vertical transverse plane of the hull, is at least in a majority of an inverted-V shape.

11. The advanced marine landing craft of claim 1 which further comprises sidehulls disposed, at least in their majority, either side of the pressurized gas cushion.

12. The advanced marine landing craft of claim 1 which further comprises a gas cushion aft seal member that is, at least in part, a structural part of the hull.

13. The advanced marine landing craft of claim 12 which further comprises a downward angling from forward to aft structural stem ramp built into an upper portion of a deck of the hull, said downward angling stern ramp extends downward into a portion of the gas cushion aft seal member.

14. The advanced marine landing craft of claim 12 wherein a lower surface of said gas cushion aft seal member, as a sum of its parts and as seen in a vertical transverse plane of the hull, is angle to horizontal over a majority of its width.

15. The advanced marine landing craft of claim 12 wherein a lower surface of said gas cushion aft seal member, as a sum of its parts and as seen in a vertical transverse plane of the hull, is at least in a majority of an inverted-V shape.

16. In an advanced marine landing craft having an artificially pressurized gas cushion disposed between an underside of a hull of said advanced marine landing craft and a water surface wherein said gas cushion, when it is pressurized with gas, supports a portion of a weight of the advanced marine landing craft, the improvement comprising:

a gas cushion aft seal member that is, at least in its majority, a structural part of the hull, a downward angling from forward to aft structural stern ramp built into an upper portion of a deck of the hull, said downward angling stern ramp extends downward into a portion of the gas cushion aft seal member, and sidehulls disposed, at least in their majority, either side of said pressurized gas cushion.

17. The advanced marine landing craft of claim 16 which further comprises a moveable, in relation to the hull, stern ramp.

18. The advanced marine landing craft of claim 16 which further comprises a fixed, in relation to the hull, aft to forward downward angling structural bow ramp built into an upper portion of a deck of the hull wherein said fixed structural bow ramp is, at least in its majority, aft of a moveable bow ramp.

19. The advanced marine landing craft of claim 16 which further comprises a moveable, in relation to the hull, gas cushion bow seal wherein said moveable gas cushion bow seal is in mechanical communication with a moveable, in relation to the hull, bow ramp and whereby said moveable gas cushion bow seal is disposed, at least in its majority on an underside of said moveable bow ramp and is positioned between the moveable bow ramp and a ground surface when the moveable bow ramp is lowered during beaching of said advanced marine landing craft.

20. The advanced marine landing craft of claim 19 wherein said moveable bow seal is, at least in part, made of a flexible material.

21. The advanced marine landing craft of claim 19 wherein said moveable bow seal is composed of multiple elements.

22. The advanced marine landing craft of claim 16 wherein a lower surface of said gas cushion aft seal member, as a sum of its parts and as seen in a vertical transverse plane of the hull, is angled to horizontal over a majority of its width.

23. The advanced marine landing craft of claim 16 wherein a lower surface of said gas cushion aft seal member, as a sum of its parts and as seen in a vertical transverse plane of the hull, is at least in its majority of an inverted-V shape.

24. In an advanced marine landing craft having an artificially pressurized gas cushion disposed between an underside of a hull of said advanced marine landing craft and a water surface wherein said gas cushion, when it is pressurized with gas, supports a portion of a weight of the advanced marine landing craft, the improvement comprising:

a moveable, in relation to the hull, gas cushion bow seal wherein said moveable gas cushion bow seal is in mechanical communication with a moveable, in relation to the hull, bow ramp and whereby said moveable gas cushion bow seal is disposed, at least in its majority, on an underside of said moveable bow ramp and is positioned between the moveable bow ramp and a ground surface when the moveable bow ramp is lowered during beaching of said advanced marine landing craft, and sidehulls disposed, at least in their majority, either side of the pressurized gas cushion.

25. The advanced marine landing craft of claim 24 wherein said moveable bow seal is, at least in its majority, made of a flexible material.

26. The advanced marine landing craft of claim 24 wherein said moveable bow seal is composed of multiple elements.

27. The advanced marine landing craft of claim 24 which further comprises a fixed, in relation to the hull, aft to forward downward angling structural bow ramp built into an upper portion of a deck of the hull wherein said fixed structural bow ramp is, at least in its majority, aft of the moveable bow ramp.

28. The advanced marine landing craft of claim 24 which further comprises a moveable, in relation to the hull, stem ramp.

29. The advanced marine landing craft of claim 28 which further comprises a fixed, in relation to the hull, downward angling from forward to aft structural stem ramp built into an upper portion of a deck of the hull wherein said fixed structural bow ramp is, at least in its majority, forward of the moveable stem ramp.

* * * * *